United States Patent
Patarchi

(10) Patent No.: US 6,486,582 B1
(45) Date of Patent: Nov. 26, 2002

(54) DYNAMO-ELECTRIC MACHINE ROTATING BY ELECTROMAGNETIC INDUCTION SUCH AS IT ACTS IN LINEAR ELECTRIC MOTORS

(75) Inventor: Alberto Patarchi, Ostia Lido (IT)

(73) Assignee: Micronasa di Patarchi Alberto, Ostia Lido (IT)

( * ) Notice: Subject to any disclaimer, the term of this patent is extended or adjusted under 35 U.S.C. 154(b) by 0 days.

(21) Appl. No.: 09/554,846

(22) PCT Filed: Jun. 11, 1998

(86) PCT No.: PCT/IT98/00155

§ 371 (c)(1),
(2), (4) Date: May 22, 2000

(87) PCT Pub. No.: WO99/27635

PCT Pub. Date: Jun. 3, 1999

(30) Foreign Application Priority Data

Nov. 21, 1997 (IT) .......................... RM97A0719

(51) Int. Cl.$^7$ .................. H02K 17/00; H02K 17/32
(52) U.S. Cl. .................. 310/166; 310/268; 310/12
(58) Field of Search .................. 310/12, 166, 298, 310/13, 14, 90; 384/549

(56) References Cited

U.S. PATENT DOCUMENTS

| | | | | |
|---|---|---|---|---|
| 3,355,914 A | * | 12/1967 | Venema et al. | ......... 310/168 X |
| 4,949,000 A | * | 8/1990 | Petersen | ..................... 310/179 |
| 5,142,173 A | * | 8/1992 | Konno et al. | ............. 310/67 R |
| 5,203,432 A | * | 4/1993 | Grinaski | ................... 310/12 X |
| 5,227,702 A | * | 7/1993 | Nahirney | ..................... 318/138 |
| 5,474,429 A | * | 12/1995 | Heidelberg et al. | ....... 310/63 X |
| 5,696,419 A | * | 12/1997 | Rakestraw et al. | ......... 310/268 |
| 5,874,792 A | * | 2/1999 | Chen et al. | ............... 310/75 C |

FOREIGN PATENT DOCUMENTS

| | | | | |
|---|---|---|---|---|
| DE | 22 17 466 A | * | 10/1973 | |
| DE | 25 06 387 | | 8/1976 | |
| DE | 25 40 908 A | * | 3/1977 | |
| DE | 43 39 791 A | * | 5/1994 | |
| FR | 2 280 229 A | * | 2/1976 | |
| GB | 227 845 A | * | 8/1925 | |
| GB | 1 282 485 A | * | 7/1972 | |
| GB | 2 094 066 A | * | 9/1982 | |
| GB | 2 103 768 A | * | 2/1990 | |
| JP | 02 088972 A | * | 3/1990 | |

OTHER PUBLICATIONS

Hofer, K. "Innovativir Linearantrieb AB Steckdose", vol. 84, No. 19, May 8, 1992, pp. 86–89, XP000288722.*

* cited by examiner

Primary Examiner—Nestor Ramirez
Assistant Examiner—Judson H. Jones
(74) Attorney, Agent, or Firm—Browdy and Neimark, P.L.L.C.

(57) ABSTRACT

The present invention relates to a dynamo-electric machine rotating by electromagnetic induction such as it acts on linear electric motors. It possesses a ring-shaped rotor (1) and an inductance coil stator (2) interacting at least with a part of said rotor (1).

7 Claims, 7 Drawing Sheets

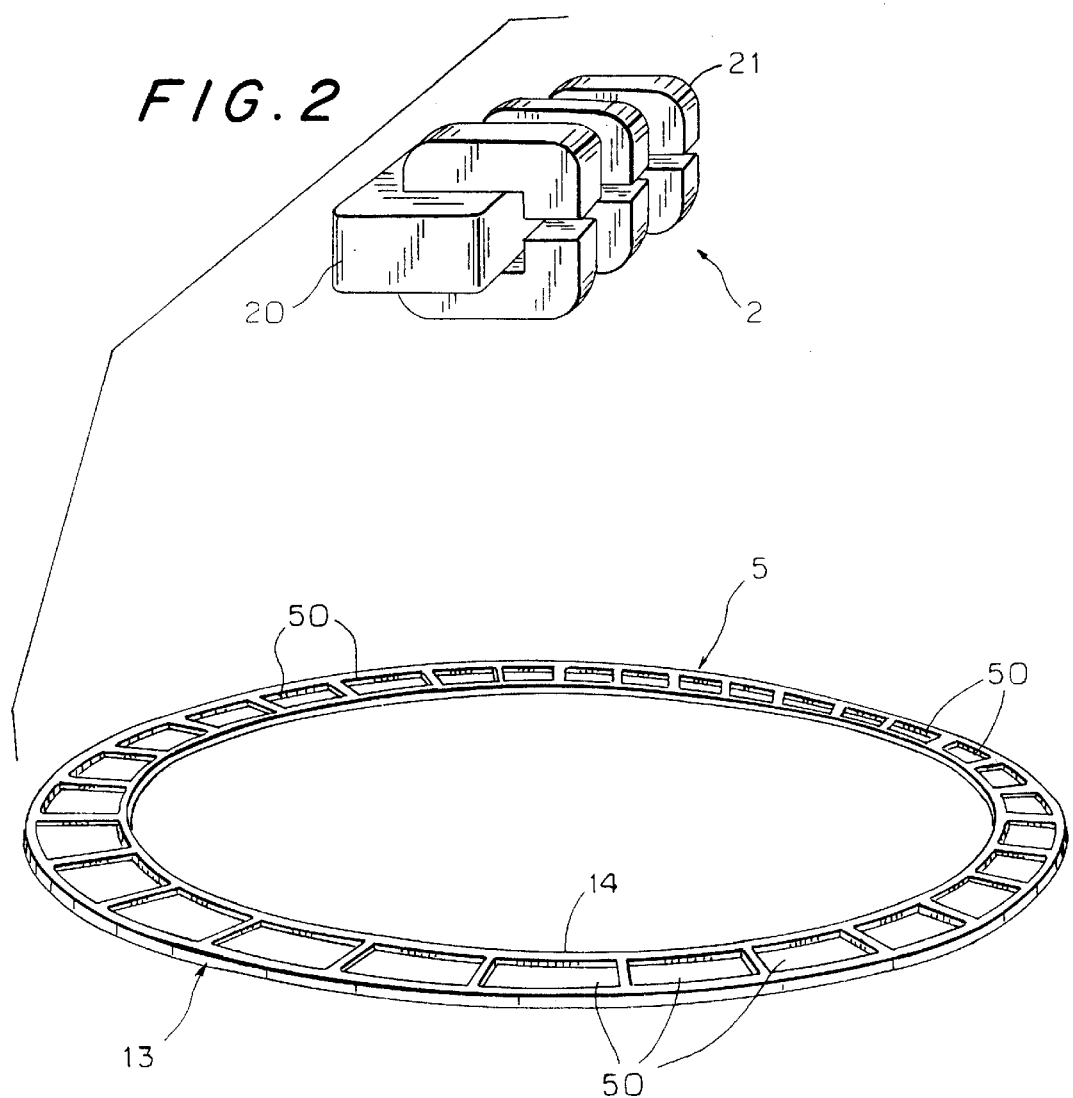

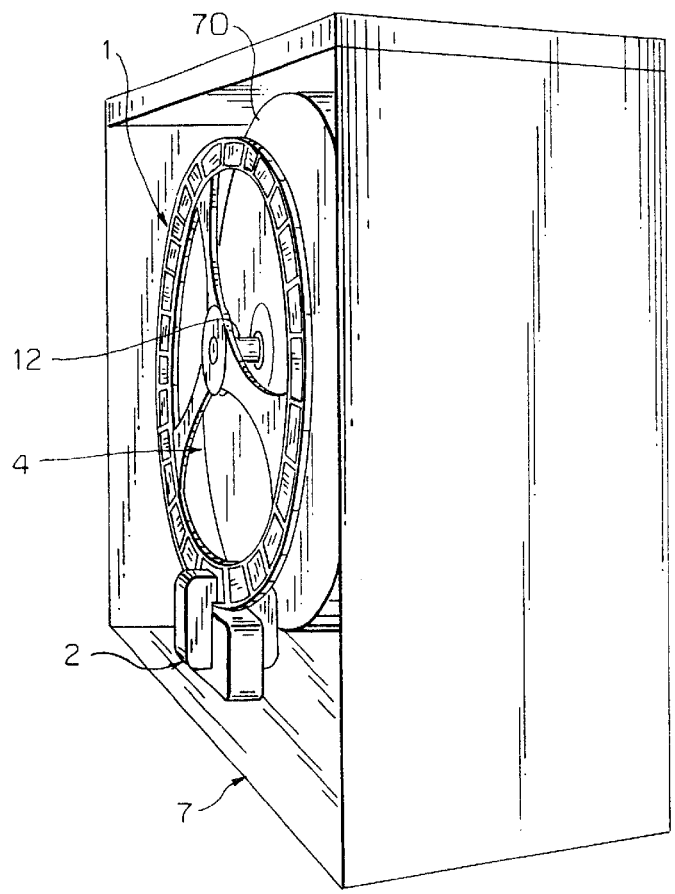
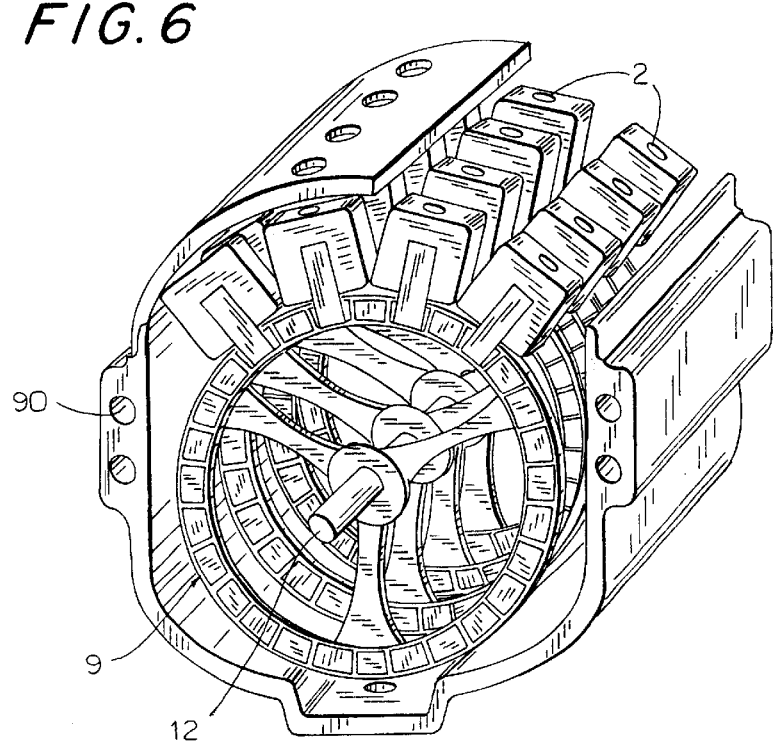

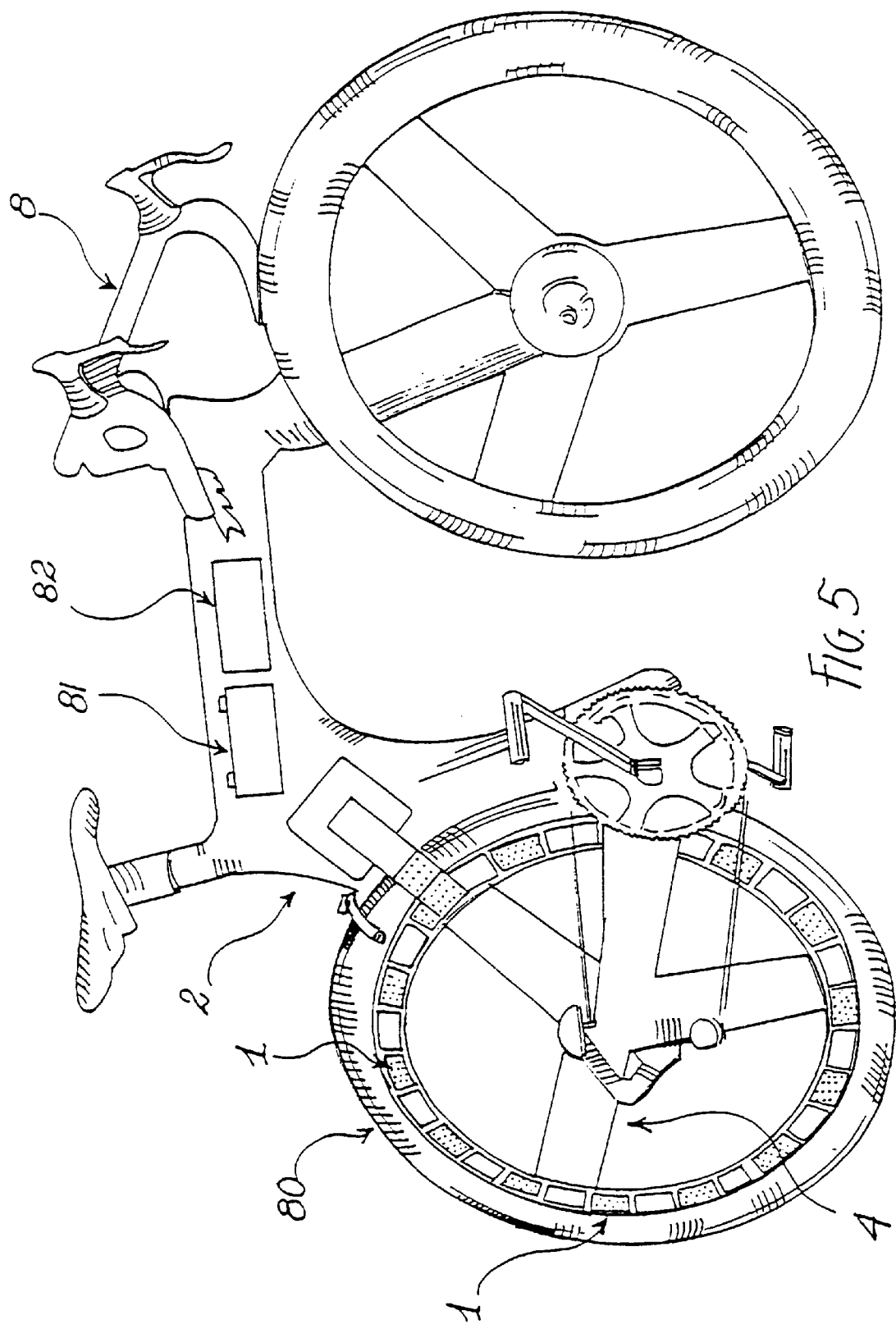

FIG. 7
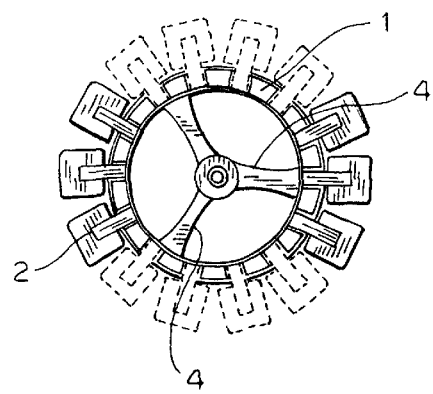
FIG. 8    FIG. 9    FIG. 10    FIG. 11
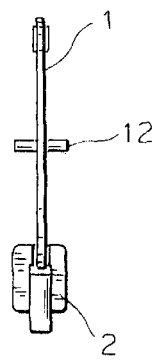 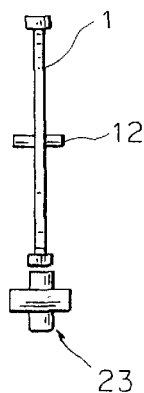 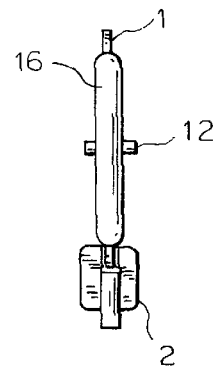 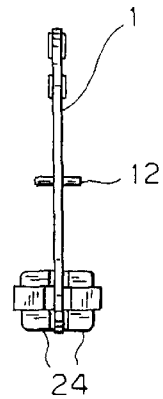
FIG. 12      FIG. 13
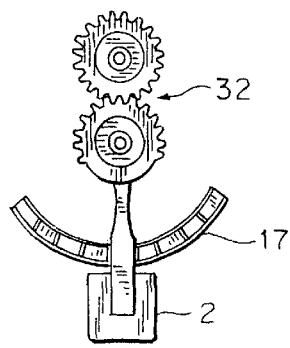 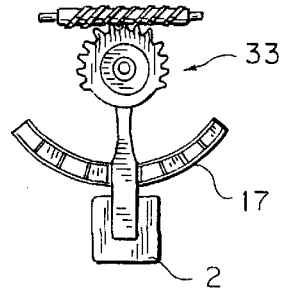

DYNAMO-ELECTRIC MACHINE ROTATING BY ELECTROMAGNETIC INDUCTION SUCH AS IT ACTS IN LINEAR ELECTRIC MOTORS

CROSS REFERENCE TO RELATED APPLICATION

The present application is the national stage under 35 U.S.C. 371 of PCT/IT98/00155, filed Jun. 11, 1998.

TECHNICAL FIELD

The present invention relates to a dynamo-electric machine rotating by electromagnetic induction such as it acts in linear electric motors.

As is well known, the linear electric motor can be thought of as being derived from a normal asynchronous motor by longitudinally sectioning and rectifying both the stator and the rotor.

The operating principle is based on the generation of a magnetic field which varies spatially with uniform rectilinear motion instead of with rotatory motion as occurs in the normal asynchronous motor.

In the asynchronous linear motor, the inductor generates currents on the armature and the interaction between such currents and the inducting field gives rise to an inducting force directed longitudinally.

It is already known that in linear motors there is no dimensional constraint between inductor and armature.

The present invention aims to overcome also the constraint of the extended shape which is the basis for the linear motor.

An example of a linear motor is disclosed in the patent DE 2217466A. The patent discloses an induction motor comprising a disc of electrical conductor and a 3-element stator, each element comprising a core and windings. Another example of a linear motor can be found in GB1282485 A that discloses a ring-shaped rotor carried by fan blades, which extend radially outward from a hub mounted on a central shaft. In any of these documents, the rotor is mounted on a central shaft. An example of a motor having a rotor in the form of a hoop can be found in the document GB2103768A. In this document the stator and the hoop are of semi-cylindrical section and are thus semi-tiroidal in shape.

DISCLOSURE OF INVENTION

The main object of the present invention is to realise a dynamo-electric machine, i.e. one operating both as a motor and as a generator, which employs the technology of the linear electric motor to allow realisations not effected so far on a rotating machine.

The invention, as it is characterised by the claims that follow, solves the problem of providing a dynamo-electric machine rotating by electromagnetic induction such as it acts in linear electric motors, which from a general standpoint is characterized in that it possesses a ring-shaped rotor in the form of a flattened annulus, being fitted with at least one circumferential rail engaged with sliding guides, and an inductance coil stator interacting at least with one part of said rotor.

In other words, the present invention allows to realise a linear electric machine which, functioning for instance as a motor, has a linear armature closed in a loop at its ends to serve as a rotor, and a related stator, at least one fixed inductor, interacting with said armature at least on a part of its said loop.

One of the advantages obtained through the present invention essentially consists of the fact that, when said rotor is mounted for rotation on sliding guides, the structure of the machine is essentially hollow, and inside it may be housed various contrivances for the direct integration of the machine itself with systems for the utilisation of mechanical or electrical energy, or both, depending on whether the dynamo-electric machine functions as a motor or as a generator, or as both at subsequent times.

Another advantage is represented by the fact that the rotor of this machine can have a moment of inertia which can be easily modified by varying its radius. Hence it is possible to modify the torque produced for equal amounts of power supplied to the induction coil, in case of operation as a motor, with the consequent optimisation in the various applications. In addition, the need for gears or other reduction and indirect transmission means normally required to adapt the torque produced by the motors to the user is eliminated. In the absence of such reduction and transmission organs, the cost normally required for the utilisation of the mechanical energy is reduced, thanks to a lower number of necessary components, and the final mechanical efficiency is also increased.

With the use of a variable number of modular inductors, the power of the machine can be modified consequently. The invention can have various types of power supply and efficiency, depending on whether it functions as a motor or as a generator.

Yet another advantage of the invention is to allow large efficiencies simply by increasing the scale factor of the embodiments.

Thanks to the simplicity of construction, provided by the modular structure of the machine, its reliability is high, and its maintenance is made easier and does not require the intervention of particularly specialised personnel.

Given its flat and essentially compact structure, the machine according to the invention is easily and conveniently integrated in all its applications, in particular in those having internal spaces with particular volumes and shapes.

Overall, with respect to prior art electric machines, improvements are obtained in all mechanical characteristics, in adaptability, in dimensional and mechanical terms for the applications, in reliability and in servicing.

DESCRIPTION OF THE DRAWINGS

Additional characteristics and advantages of the present invention shall become more readily apparent from the detailed description that follows, of preferred. embodiments shown purely by way of non limiting indications in the accompanying drawings wherein:

FIG. 2 shows a schematic perspective view of major components of the machine in a second embodiment of the invention.

FIG. 3 shows a schematic side view of major components of the machine in a third embodiment of the invention.

FIG. 4 shows a schematic perspective view, partially sectioned off, of the machine according to the invention in a first application thereof.

FIG. 5 shows a schematic perspective view of the machine according to the invention in a second application thereof FIG. 6 shows a schematic perspective view, partially sectioned off, of the machine according to the invention in a third application thereof FIG. 7 shows a plan schematic view of the machine according to the invention with central support rotor and multiple inductors.

FIGS. 8 through 11 show schematic side views of the machine with central support rotor in constructive variations.

FIGS. 12 and 13 show schematic plan views of the machine in two different servo-mechanisms.

DESCRIPTION OF THE ILLUSTRATIVE EMBODIMENTS

Figure 1:
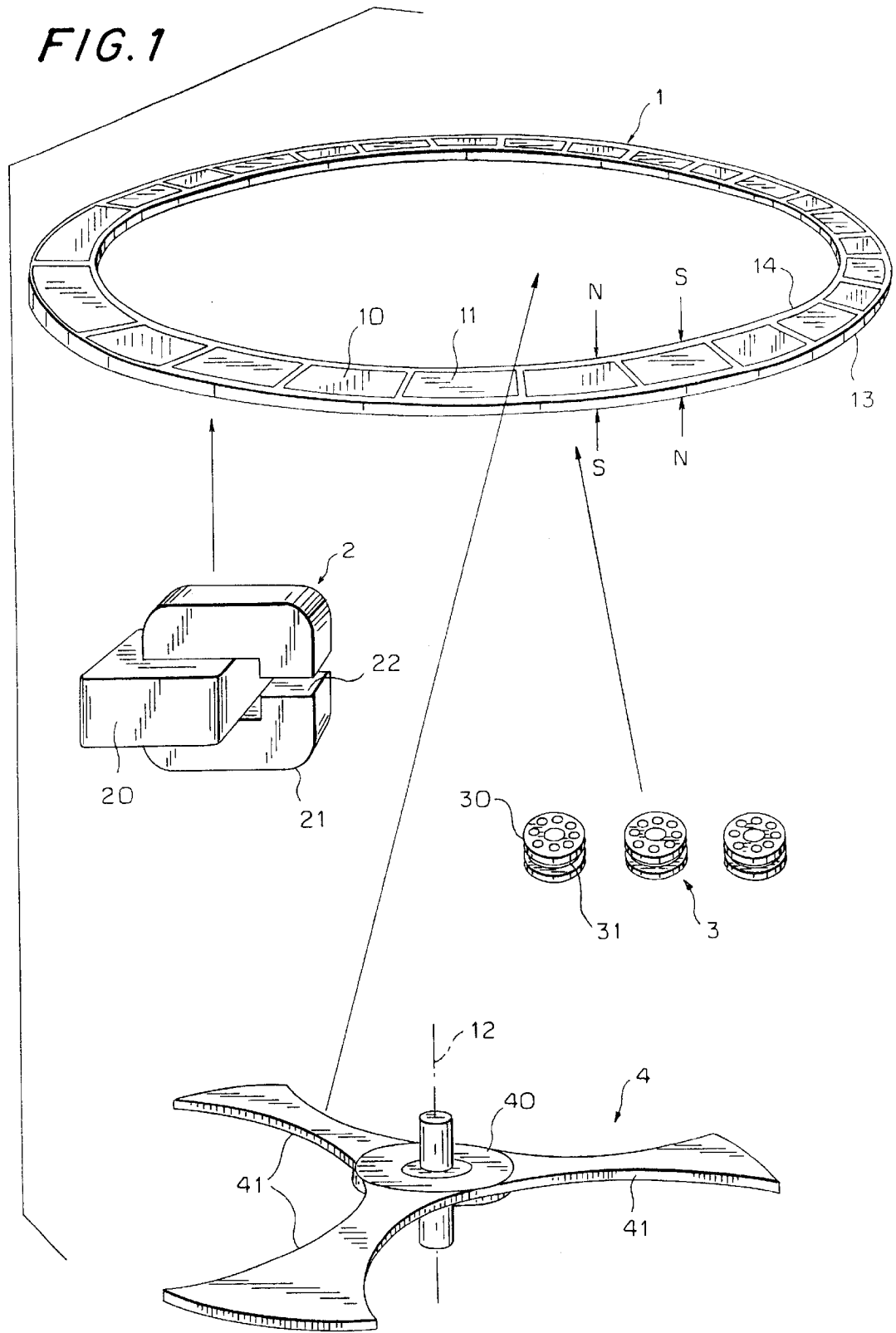
FIG. 1 shows a schematic perspective view of major components of the machine according to the invention.
Figure 14:
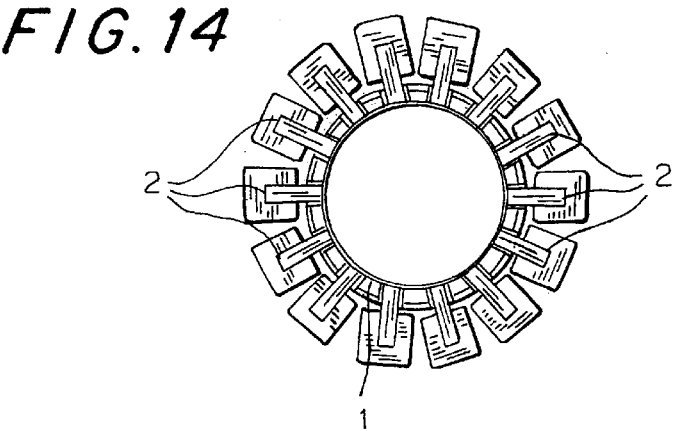
FIGS. 14 through 18 show schematic plan views of the machine in different construction and application variations fitted with sliding guides.
Figure 15:
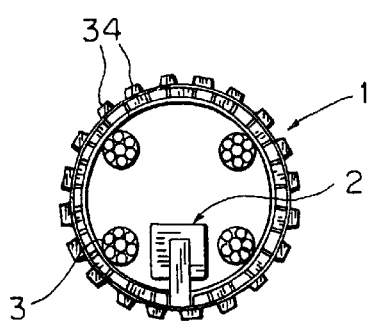
Figure 16:
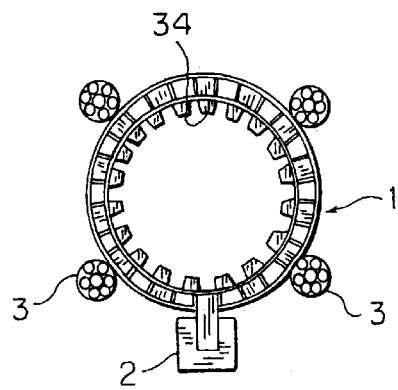

In accordance with the present invention, in the figures identical or similar parts of the machine according to the invention are indicated with the same numbers. With reference to FIG. 1, the number 1 indicates a rotor, the number 2 a stator, the number 3 sliding guides for the rotation of the rotor 1 and, alternatively thereto, the number 4 indicates a central support for the same rotor 1.

The rotor 1 is obtained by closing in a loop the armature of a linear motor. The rotor 1 therefore is ring-shaped, like an annulus, and it has preferably flattened shape. In a first embodiment thereof, shown in FIG. 1, the rotor comprises permanent magnets, generically indicated as 10 and 11, arranged in succession with their N, S polarities opposing one another in orderly fashion. Other embodiments of the rotor are shown and described hereafter with reference to FIGS. 2 and 3.

In a first embodiment, the rotor 1 is splined onto the shaft 12 of the machine by means of the central support 4, comprising a hub 40 and multiple spokes, indicated generically as 41. The spokes 41 together may constitute a single disk (not shown). FIG. 1 shows three spokes 41. Some applications of the rotor with central support are shown and described hereafter.

A second embodiment, alternatively to the central support 4 with central shaft, can comprise the sliding guides 3 for the rotation of the rotor 1. The sliding guides 3 can be formed essentially by roller 30 fastened and revolving adjacent to the rotor (as shown in the subsequent figures), each roller 30 being provided with a circumferential groove 31. In the circumferential groove 31 of the rollers 30 is received a projection 13, 14 formed on all the outer and, respectively, inner periphery of the rotor. One or the other of the projections 13 and 14 serves as a guiding rail for the rotation of the rotor 1. Therefore, with this embodiment the machine according to the invention is internally hollow, allowing for multifarious applications, whereof some are shown and described below.

The stator 2 is an inductor interacting at least with one part of the rotor 1. It comprises an inductance coil 20 and an electromagnetic core 21. The electromagnetic 21 presents an air gap 22. With respect to the rotor 1, the stator 2 is fastened in such a way that the rotor 1 crosses through the air gap 22, so that the end facets of the electromagnetic core 21 face the permanent magnets 10, 11 of the rotor 1.

Alternatively, the stator can comprise, as shown hereafter, at least an inductance coil and a closed magnetic core with flux concatenated with the rotor.

With reference to the FIG. 2, in a second embodiment, a ring-shaped rotor 5 comprises, instead of the orderly succession of permanent magnets, a succession or self-induction turns generically indicated as 50. The stator is represented by three inductance coils crossed by respective current phases.

With reference to FIG. 3, in a third embodiment a ring-shaped rotor 6 comprises a crown 60 made of material able to be magnetised, for instance soft iron, sandwiched between two opposite crowns 61, 62 made of a material not subject to magnetisation, such as an aluminum alloy. In this third embodiment of the machine according to the invention, the stator is schematically shown as an inductor with three opposed poles 25, 25 powered in pairs with a respective phase of the power supply line A, B and C. The interaction between the fields of the poles integral with the stator inductor and the currents induced in the metallic rotor 6 produces, peripherally thereto, an accelerating force represented by the tangential arrow F in FIG. 3.

FIG. 4 schematically shows an application of the machine according to the invention, functioning as a motor in a washing machine 7. The shaft 12, whereon is splined the central support 4 of the rotor 1, is integral with the central agitator (not shown) of the washing machine 7, inside its tank 70. This application of the machine according to the invention highlights the advantages described above, among them the absence of some transmission organs, such as bearings, pulleys, transmission belt, the increase in efficiency, the reduction of the size of the appliance, the easier maintenance. The control unit of the motor according to the invention instead is similar to that of the traditional motor and therefore is not described.

FIG. 5 schematically shows another application of the machine according to the invention, to the driving wheel 80 of a bicycle 8. The rotor 1 is integral with the wheel 80, whilst the central support 4 of the rotor replaces the spokes of the wheel. The stator 2 is connected to a buffer battery 81, which is charged when the machine according to the invention functions as a generator, i.e. when muscle power is used, in downhill stretches of roads and when braking. The motor starts operating when high speeds are desired, or uphill or when, on a flat stretch of road, the rider wishes to proceed without effort. The control unit is shown schematically as 82. Immediately apparent are the advantages of the invention with respect to the other current systems of electric drive for bicycles, and like them the invention can use a solar cell battery charger.

FIG. 6 schematically shows yet another application of the machine according to the invention, as a driving device for aport vehicles. An electric motor is constructed with a shaft 12 having four stages 9 and four inductor modules 2 for each stage. The motor is placed inside a casing, in oil bath, provided with a cooling circuit 90.

FIGS. 7 through 11 show, by way of example, some versions of central support rotor for electric machines according to the invention. The stator may have the desired number of inductors 2 (FIG. 7), which encompass the rotor 1 with their air gap (FIG. 8). The rotor 1 (FIG. 9) can present a metallic ring 15 able to be magnetised and an inductor 23, external to the rotor 1. The flux of the inductor 23 is concatenated with the rotor 1 through the ring 15. The rotor 1 can have its moment of inertia increased by a flywheel mass 16 (FIG. 10) or it may have its induction enhanced by a pair of opposed inductors 24 (FIG. 11).

FIGS. 12 and 13 show, by way of example, some versions of central support rotor for electric machines according to the invention applied to servo-controls. The stator 2 interacts with a rotor limited in its extension to an annulus portion 17. To this annulus portion 17 is integral an arm connected to a pair of gears 32 (FIG. 12) or to a wheel and worm screw pair 33 (FIG. 13).

Figure 18:
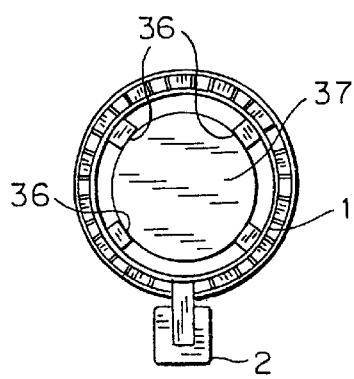
Figure 17:
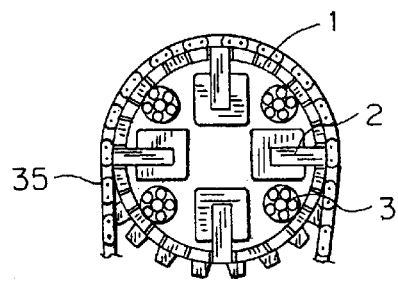

FIGS. 14 through 18 show, by way of example, some versions of rotor with sliding guides for electric machines according to the invention. The stator can have the desired number of inductors 2 (FIG. 14), which encompass the rotor 1 with their air gap (FIG. 8). The cavity inside the rotor can be used for the integration of the machine according to the invention with the desired utilisation. The rotor 1 (FIG. 15) can present internal sliding guides 3 and internal stator 2 and it can be provided with external mechanical transmission means, shown schematically as 34. The rotor 1 (FIG. 16) can present external sliding guides 3 and external stator 2 and it can be provided with internal mechanical transmission means, shown schematically as 34. FIGS. 17 and 18 schematically show two examples of the application shown, respectively, in FIGS. 15 and 16. In FIG. 17, the rotor presents internal sliding guides 3, four internal inductors 2 and on its outer periphery teeth for engagement with a chain 35. In FIG. 18, the rotor 1 presents, though they are not shown, external sliding guides, an external inductor 2 and on its inner periphery means 36 for connection with a drum 37.

Figure 19:
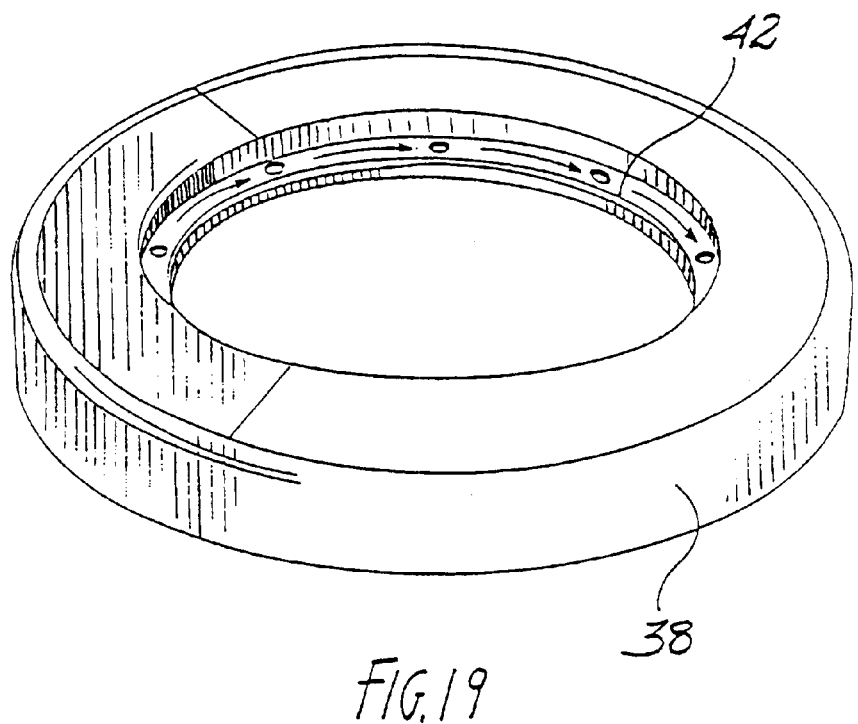
FIGS. 19 and 20 show schematic perspective views of two versions, complete with casing of the machine according to the invention, for the radially internal and. respectively, external transmission.
Figure 20:
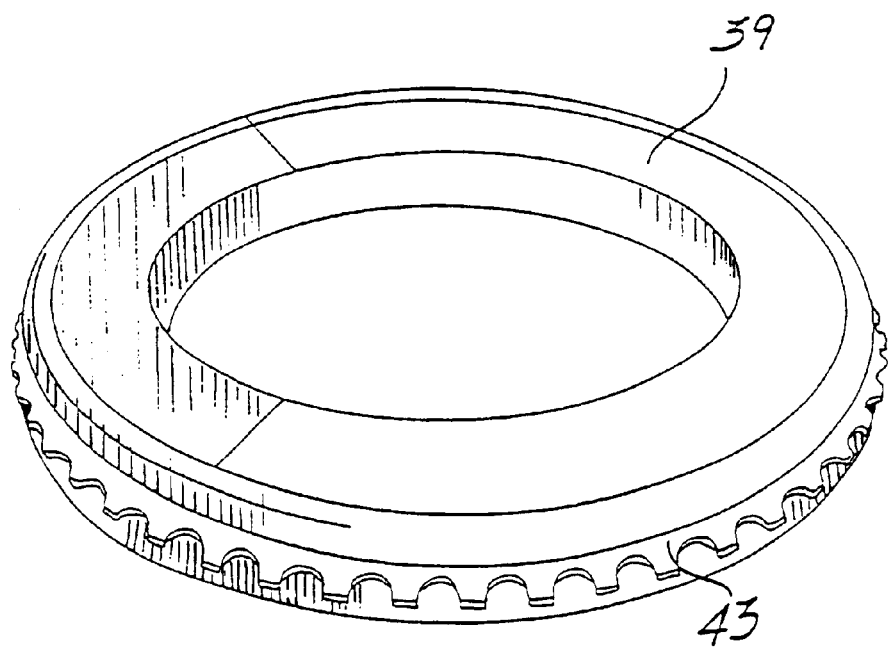

Lastly, FIGS. 19 and 20 show a single stage machine according to the present invention, enclosed in a hollow cylinder casing 38, 39, and provided with internal connecting means for transmission, such as a flange 42 (FIG. 19) and with external transmission means such as a crown gear 43 (FIG. 20). The compactness of the machine according to the invention is further shown.

The invention thus conceived can be subject to numerous modifications and variations, without thereby departing from the scope of the same innovative concept. Moreover, all components can be replaced with technically equivalent elements. In practice, modifications and/or improvements are possible without thereby departing from the scope of the claims that follow.

What is claimed is:

1. Dynamo-electric machine rotating by electromagnetic induction such as it acts in linear electric motors, characterised in that it possesses a ring-shaped rotor (1) in the form of a flattened annulus, being fitted with at least one circumferential rail (13, 14) engaged with guides, and an inductance coil stator (2) interacting at least with one part of said rotor (1), and further characterised in that said circumferential rail (13) is external to the stator (2).

2. Electromagnetic machine according to claim 1, characterised in that said stator (2) comprises at least one inductance coil (20) and an electromagnetic core (21) provided with an air gap (22) crossed by said rotor (1).

3. Electromagnetic machine according to claim 1, characterised in that said stator (2) comprises at least one inductance coil (23) and a closed magnetic core with flux concatenated with said rotor (1).

4. Electromagnetic machine according to claim 1, characterised in that said ring-shaped rotor (1) comprises a succession of permanent magnets (10, 11) with polarities opposed in orderly fashion.

5. Electromagnetic machine according to claim 1, characterised in that said ring-shaped rotor (5) comprises a succession of self-induction turns (50).

6. Dynamo-electric machine rotating by electromagnetic induction such as it acts in linear electric motors, characterised in that it possesses a ring-shaped rotor (1) in the form of a flattened annulus, being fitted with at least one circumferential rail (13, 14) engaged with sliding guides, and an inductance coil stator (2) interacting at least with one part of said rotor (1), and further characterised in that said ring-shaped rotor (5) comprises a crown made of a material able to be magnetised (60) sandwiched between two opposite crowns (61, 62) of a material not subject to magnetisation.

7. Electromagnetic machine according to claim 6, characterised in that said material able to be magnetised is soft iron and said material not subject to magnetisation is an aluminum alloy.

* * * * *